J. McDONALD.
Grain-Drill
No. 58,274.
Patented Sept. 25. 1866.
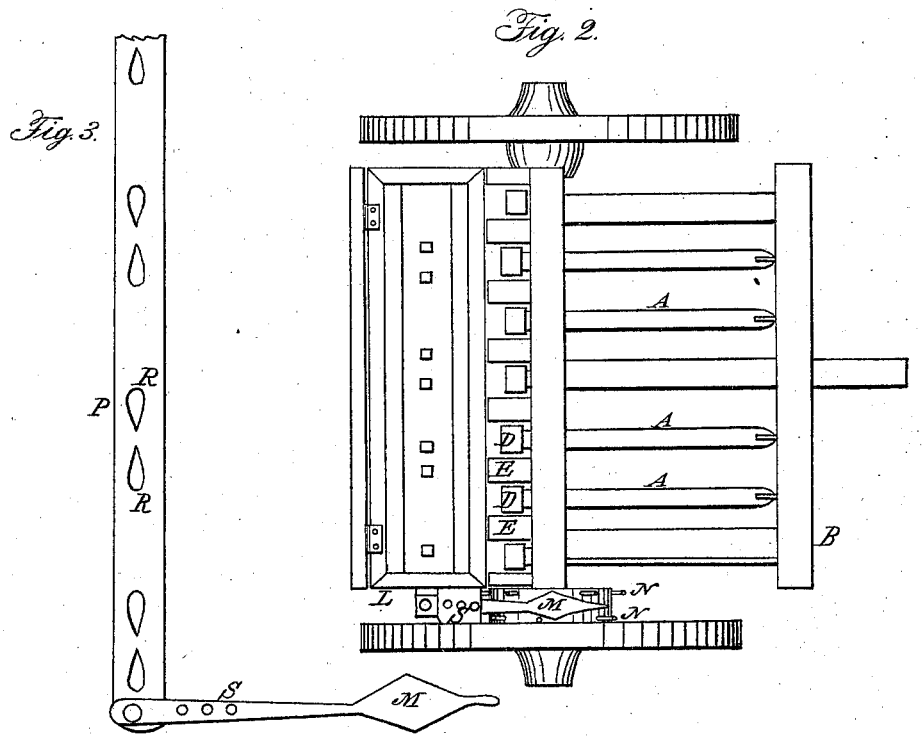
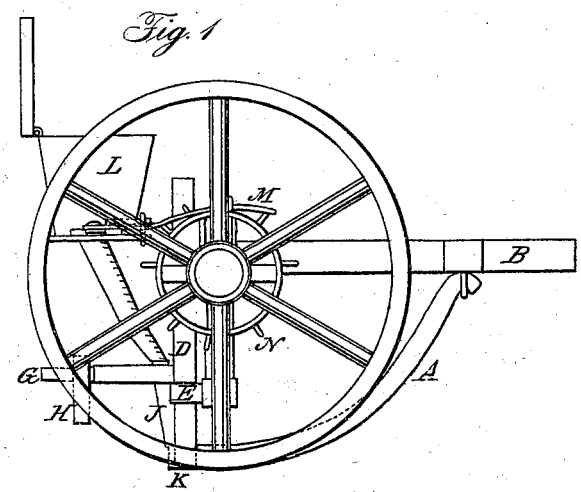
Witnesses:
L Luchs
Jno Peck
Inventor:
John McDonald
by his Atty
J Franklin Reigart

UNITED STATES PATENT OFFICE.

JOHN McDONALD, OF HARDIN, ILLINOIS.

IMPROVEMENT IN GRAIN-DRILLS.

Specification forming part of Letters Patent No. 58,274, dated September 25, 1866.

*To all whom it may concern:*

Be it known that I, JOHN McDONALD, of Hardin, Calhoun county, State of Illinois, have invented new and useful Improvements in Seed-Drills; and I do hereby declare the following to be an exact description thereof, reference being had to the accompanying drawings, and to the letters of reference marked thereon, making a part of this specification.

The nature of my invention consists in the shape of the apertures of the center slide, being pointed and rounding; also, the arrangement, shape, and construction of the cutters, with tubes and grooves at their rear ends to guide the seeds to their furrows as they fall from the hopper.

The object of the shape of the apertures of the slide is to sow both ways as the slide moves over the apertures underneath, and between them and the square apertures of the upper slide, and for the purpose of sowing small seed as well as grain, and regulating the quantity by shortening or widening the vibration of the zigzag lever by moving a pin back or forward in the apertures of the lever.

The object of the cutters (that are both drag-bars and cutters) is for the purpose of cutting the stubbles, grass, and weeds as they make their furrow, thus dispensing with the ordinary drag-bars and teeth, or bury them in the furrow, or slide over instead of dragging the weeds, as usual with the ordinary teeth.

The hind or rear end of the drag-bars are made of steel, so as to operate as cutters to make the furrow, and have weights at the ends of the back levers to regulate the depth of furrow according to the character of the soil and the depth required for the seed. Each cutter follows the inequalities of the ground.

Figure 1 represents an end view of the seed-drill; Fig. 2, a top view; Fig. 3, the center slide and vibrating lever.

A represents the cutters, operating in front on a pivot or hook on the front part of frame B.

The back end of the cutter is sharpened steel, for cutting the weeds, &c., and making the furrow for the grain to drop in.

At the end of each cutter A is an upright, D, working between guides or staples E, and having a lever, G, with a weight, H, attached to keep the cutter A in its regular position and down to the proper depth of furrow required.

The lower part or back end of upright D has a tube or guide, J, and a groove, K, underneath for the grain to pass regularly through.

L is an ordinary hopper, and M a vibrating lever, that vibrates between teeth N, set diagonally on the carriage-wheel, as commonly used to operate a slide.

The slide P has long apertures R, pointed at one end and round at the other. These apertures operate their whole or part of their length between upper and lower apertures of the hopper, according to the length of stroke given to the lever, by inserting a pin in one of the apertures, S, to form a fulcrum for the purpose of regulating the size and quantity of the grain to be sown.

What I claim as my invention, and desire to secure by Letters Patent, is—

The independently-hinged cutters A, levers G, weights H, and tubes J, in combination with the slide P, lever M, and pins N, when constructed and arranged substantially as and for the purpose set forth.

JOHN McDONALD.

Witnesses:
J. FRANKLIN REIGART,
JOHN S. HOLLINGSHEAD.